(12) United States Patent
Kramarczyk et al.

(10) Patent No.: US 7,000,966 B2
(45) Date of Patent: Feb. 21, 2006

(54) PICK-AND-PLACE TOOL

(75) Inventors: Mark A. Kramarczyk, Westland, MI (US); Gary Lee Jones, Farmington Hills, MI (US); Yhu-Tin Lin, Rochester Hills, MI (US); Phillip A. Bojda, Macomb, MI (US)

(73) Assignee: General Motors Corporation, Detroit, MI (US)

( * ) Notice: Subject to any disclaimer, the term of this patent is extended or adjusted under 35 U.S.C. 154(b) by 212 days.

(21) Appl. No.: 10/254,458

(22) Filed: Sep. 24, 2002

(65) Prior Publication Data

US 2004/0056495 A1 Mar. 25, 2004

(51) Int. Cl.
*B25J 15/00* (2006.01)
(52) U.S. Cl. .................. 294/86.4; 294/88; 279/406; 901/49
(58) Field of Classification Search ............ 294/86.4, 294/88, 86.1, 86.15, 86.3, 86.33, 90; 901/46, 901/49; 414/751.1; 279/4.06, 4.07, 4.08, 279/4.09, 4.1, 4.11, 4.12; 269/27, 30, 32
See application file for complete search history.

(56) References Cited

U.S. PATENT DOCUMENTS

| | | | | |
|---|---|---|---|---|
| 650,686 A | * | 5/1900 | Leask | 175/237 |
| 4,469,362 A | * | 9/1984 | Schaarschmidt et al. | 294/116 |
| 4,514,616 A | * | 4/1985 | Warner | 219/136 |
| 4,815,780 A | * | 3/1989 | Obrist | 294/86.4 |
| 4,855,558 A | * | 8/1989 | Ramsbro | 219/69.15 |
| 6,160,236 A | * | 12/2000 | Nordquist | 219/69.15 |
| 6,186,567 B1 | * | 2/2001 | Blick | 294/86.4 |

\* cited by examiner

*Primary Examiner*—Dean J. Kramer
(74) *Attorney, Agent, or Firm*—Kathryn A. Marra (57) ABSTRACT

A pick-and-place tool releasably retains a part during a pick-and-place operation by an automated device. The pick-and-place tool includes a front structure having a first bore disposed therein for receiving a shaft extending from the part. A plurality of locking mechanisms is disposed within the front structure. The plurality of locking mechanisms are evenly spaced around the inner surface and are in fluid communication with a common fluid source. Each locking mechanism in the plurality of locking mechanisms includes a bearing disposed proximate an aperture in the inner surface, and a piston in mechanical communication with the bearing. Movement of the piston in response to a fluid pressure at the common fluid source forces the bearing to extend through the aperture and retain the shaft within the first bore. In one aspect, a resilient member is disposed between the front structure and a tool holder coupled to the automated device. The resilient member absorbs at least a portion of a force applied to the front structure.

20 Claims, 7 Drawing Sheets

PICK-AND-PLACE TOOL

BACKGROUND

The present invention relates to automated devices and, more specifically, to tools for automated devices.

Automated devices, such as robots or numerically controlled machines, include a manipulator, such as an arm, a spindle, or any other movable structure, whose movement is controlled by a computer. To increase the functionality of the automated device, the manipulator is typically fitted with an adapter for accepting different tools. Each of the different tools allows the manipulator to perform a different function. The adapter may accept, for example, machining tools, grasping tools, welding tools, etc. These different tools are typically stored in a tool magazine, and the automated device may be programmed to retrieve the different tools from the tool magazine as the tools are needed to perform various procedures.

One type of tool, known as a pick-and-place tool, allows the manipulator to pick up a part, move the part to a desired location, and release the part at the desired location. One application of a pick-and-place tool is in automated machining, such as, for example, computer automated machining (CAM), computer numerical control (CNC) machining, or robotic machining. In automated machining, for example, a pick-and-place tool may be employed to reconfigure a modular fixture.

In automated machining, a fixture is a mechanical structure that supports the part being machined. A modular fixture is a fixture that can be reconfigured for use with different parts. A modular fixture may include a base to which various supports are removably attached. Using a pick-and-place tool, the manipulator may position the various supports to correspond to the contours or other locating features of the part to be machined. The accuracy with which the manipulator locates the various supports affects the accuracy with which the part is positioned relative to the automated machining device and, therefore, the accuracy of the machining. Accordingly, for this and other applications, the pick-and-place tool must allow the pick-and-place process to be performed accurately.

SUMMARY OF THE INVENTION

In an exemplary embodiment, a pick-and-place tool releasably retains a part during a pick-and-place operation by an automated device. The pick-and-place tool includes a front structure having a first bore disposed therein for receiving a shaft extending from the part. The first bore extends from a free end of the front structure and along a longitudinal axis of the front structure to define an inner surface of the front structure. A plurality of locking mechanisms is disposed within the front structure. The plurality of locking mechanisms is evenly spaced around the inner surface and is in fluid communication with a common fluid source. Each locking mechanism in the plurality of locking mechanisms includes a bearing disposed proximate a hole in the inner surface, and a piston in mechanical communication with the bearing and in fluid communication with the common fluid source. Movement of the piston in response to a first fluid pressure at the common fluid source forces the bearing to extend through the aperture and retain the shaft within the first bore.

In another aspect, a resilient member is disposed between the front structure and a tool holder coupled to the automated device. The resilient member is configured to absorb at least a portion of a force applied to the front structure.

BRIEF DESCRIPTION OF THE DRAWINGS

Referring to the exemplary drawings wherein like elements are numbered alike in the several Figures.

DETAILED DESCRIPTION

Figure 1:
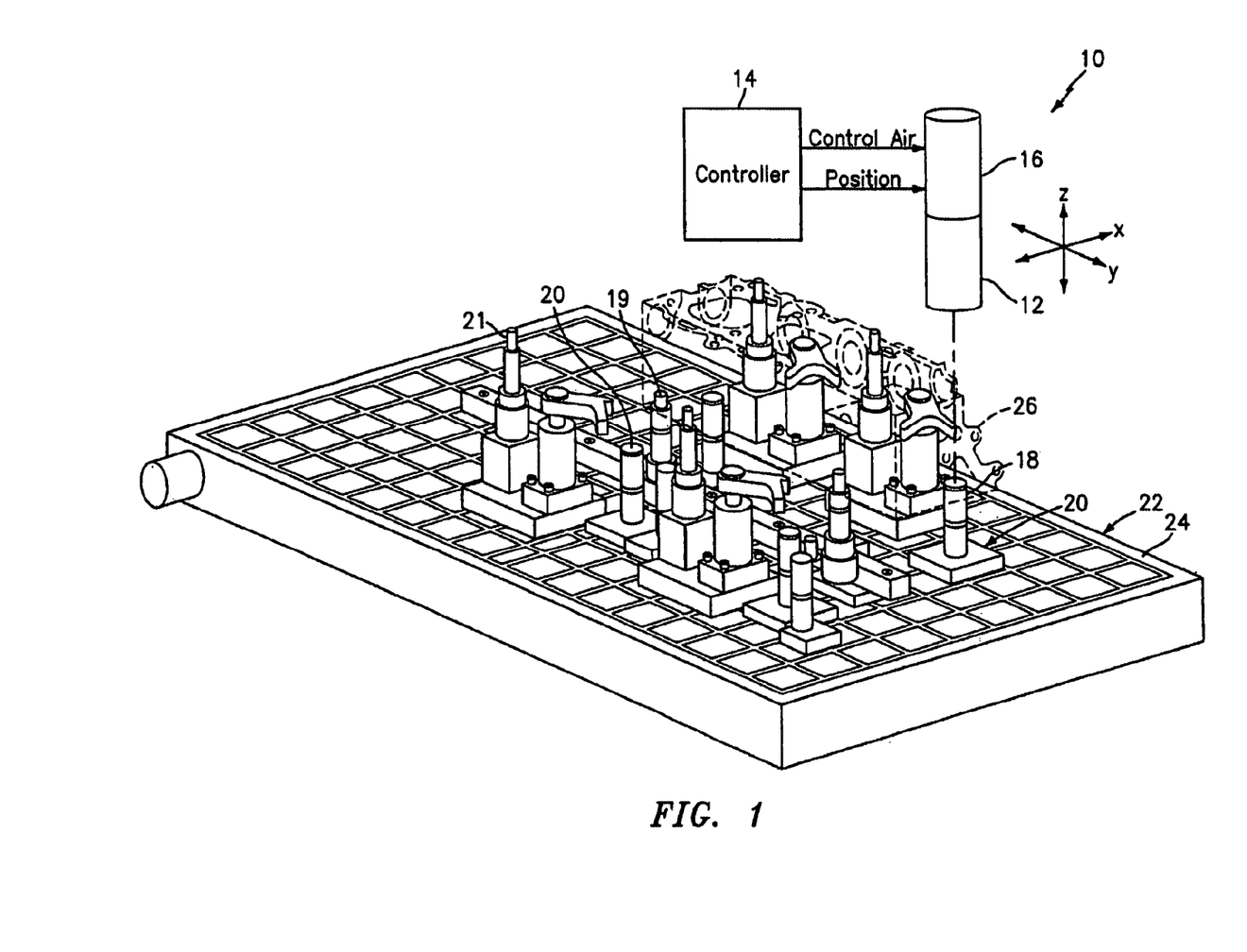
FIG. 1 is a schematic view of an automated device employing a pick-and-place tool.

Referring to FIG. 1, a schematic view of an automated device 10 employing a pick-and-place tool 12 is shown. Automated device 10 may be any robot or numerically controlled machine. Automated device 10 includes a controller 14, which provides directional input to a manipulator 16. Manipulator 16 may include an arm, a spindle, or any other movable structure, whose movement is controlled by the controller 14. Controller 14 directs the manipulator 16 in the x, y, and z directions to position the pick-and-place tool 12 over a shaft 18 extending from a part 20 and, after the shaft 18 has been secured within the tool 12, move the part 20 to a desired location and release the part 20 from the tool 12. Controller 14 also provides fluid (e.g., air, water, etc.) control signals to the pick-and-place tool 12, via the manipulator 16, to activate locking mechanisms, described hereinafter, within the tool 12 for securing the shaft 18 within, and releasing the shaft 18 from, the tool 12.

In the example shown in FIG. 1, the part 20 is a support within a modular fixture 22, and the automated device 10 is an automated machining center, such as, for example, computer automated machining (CAM) center, computer numerical control (CNC) machining center, or robotic machining center. It will be recognized, however, that the pick-and-place tool 12 may be employed for other purposes as well. In FIG. 1, the modular fixture 22 includes a number of different fixture elements, which include locators 19, supports (parts) 20 and clamps 21, removably attached to a base 24 through magnetic force, for example. The pick-and-place tool 12 can be equally applied to both the locators 19 and supports 20 since they share a common shaft 18 design for the tool 12 to pickup. While pick-and-place tool may be used to pick up and place any part having a shaft 18, to simplify the following description, only supports 20 will be used to illustrate the invention concept.

Using the pick-and-place tool 12, the manipulator 16 positions the various supports 20 to correspond to contours or other locating features of a part to be machined 26, which is shown in phantom. After the supports 20 are located and secured in their appropriate positions, the part to be machined 26 is then positioned on the supports 20, where it can be machined. Typically, the machining is performed by replacing the pick-and-place tool 12 with a tool designed for machining the part.

Figure 2:
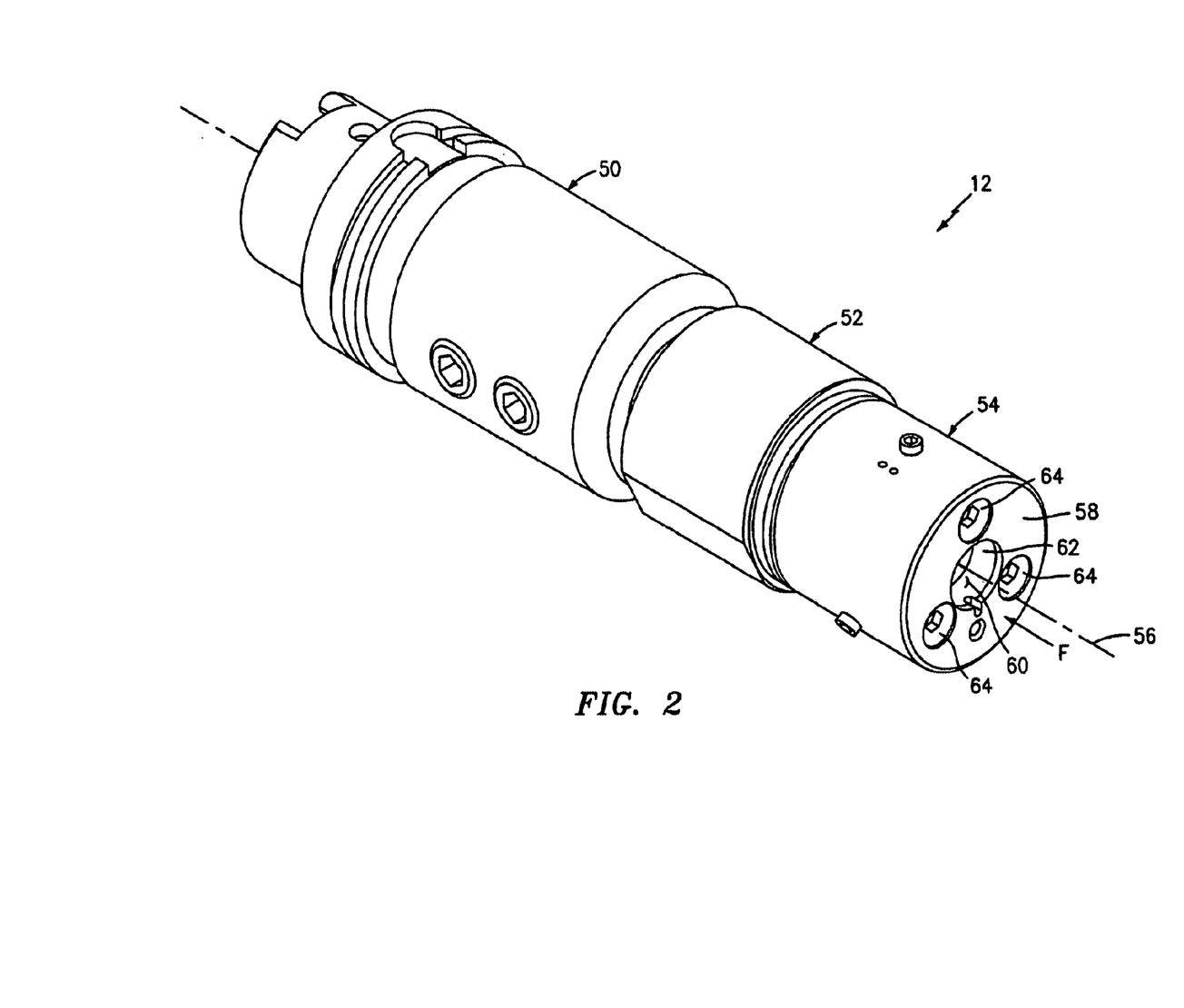
FIG. 2 is a perspective view of the pick-and-place tool.

Referring to FIG. 2, a perspective view of the pick-and-place tool 12 is shown. Pick-and-place tool 12 includes a tool holder portion 50, a coupling structure 52, and a front structure 54. In the embodiment shown, tool holder portion 50, coupling structure 52, and front structure 54 are all generally cylindrical structures having a common longitudinal axis 56. Tool holder portion 50 couples tool 12 to the manipulator 16, and may include any stock tool holder available for a particular manipulator 16. Coupling structure 52 couples the front structure 54 to the tool holder portion 50. Coupling structure 52 includes a resilient member, described in further detail hereinafter, disposed therein for absorbing at least a portion of a force F applied to the front structure 54. Front structure 54 includes a bore 60 disposed therein for receiving the shaft 18 on part 20 (FIG. 1). Bore 60 extends from the free end 58 along the longitudinal axis 56 and defines an inner surface 62 of the front structure 54. Also disposed within the front structure 54 is a plurality of locking mechanisms 64, which are evenly spaced around the inner surface 62. While three locking mechanisms 64 are shown, it will be recognized that two or more locking mechanisms 64 may be employed.

Figure 3:
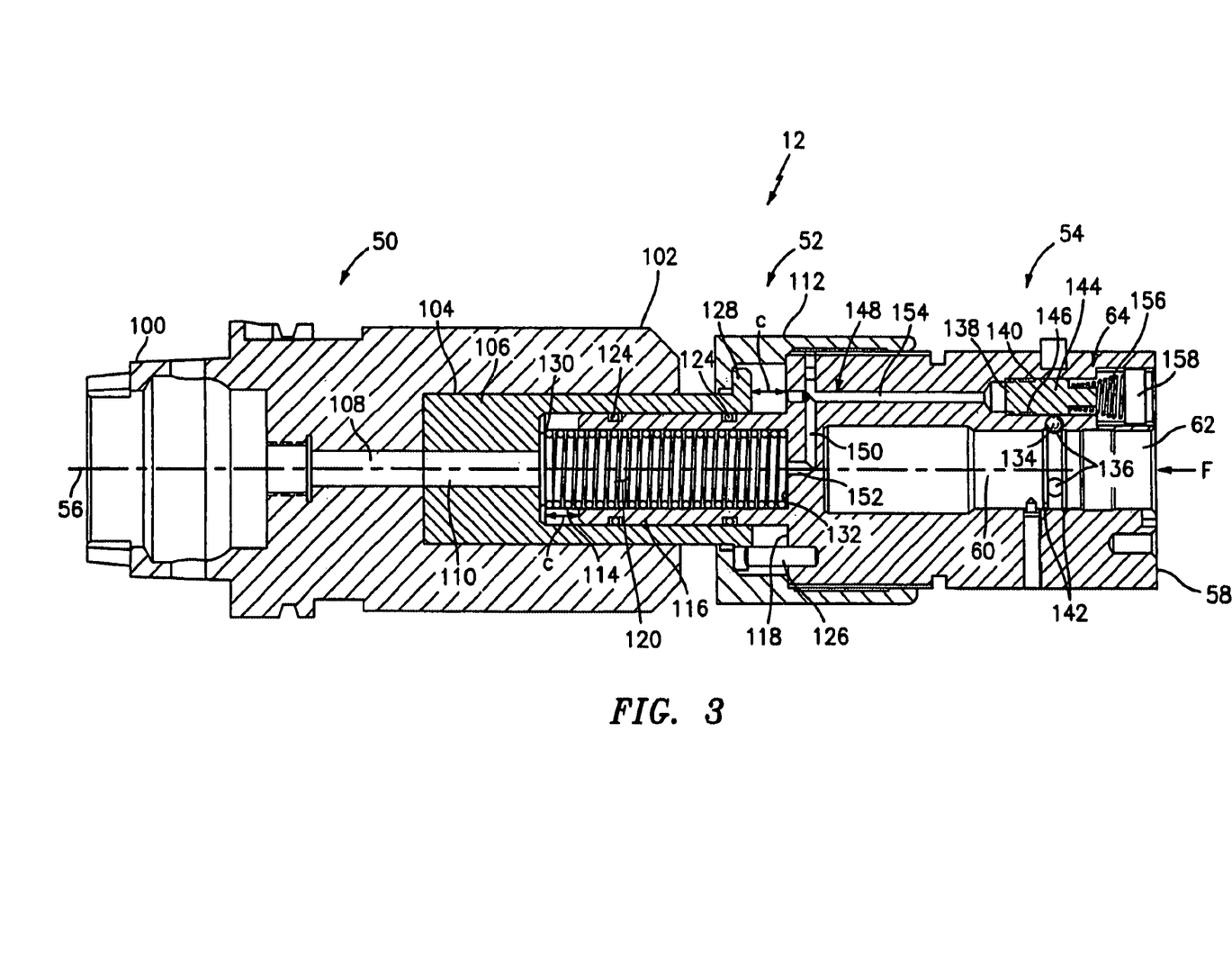
FIG. 3 is a cross-sectional view of the pick-and-place tool.

Referring now to FIG. 3, a cross-sectional view of the pick-and-place tool 12 is shown. Tool holder portion 50 includes an end 100 configured for attachment to the manipulator 16 (FIG. 1) and an opposite end 102 configured to receive the coupling structure 52. The design of tool holder portion 50, and its attachment to coupling structure 52, may be any convenient design for a particular manipulator 16. In the embodiment shown, tool holder portion 50 includes a bore 104 disposed therein for receiving a cylindrical sleeve 106, which forms part of the coupling structure 52. The sleeve 106 is rigidly secured within bore 104. An air hole 108 extends through the center of tool holder portion 50 and is in fluid communication between a fluid source, such as controller 14 (FIG. 1), and an air hole 110 disposed through the center of sleeve 106.

Coupling structure 52 includes cylindrical sleeve 106, a retaining collar 112, a resilient member 114, and a cylindrical sleeve 116. In the embodiment shown, resilient member 114 is a spring; however, resilient member 114 may also include a structure formed from a resilient material such as rubber, neoprene, etc. Cylindrical sleeve 116 extends from an end 118 of front structure 54 opposite free end 58. A portion of sleeve 116 extends within sleeve 106 to form a chamber 120 that holds the resilient member 114. Formed around an outer surface of sleeve 116 are slots, which accept sealing rings 124. Sealing rings 124 contact an inside surface of sleeve 106 to prevent the escape of pressurized air from chamber 120. Rotation between the two sleeves 106 and 116 is prevented by a pin 126, which is secured to front structure 54 and extends through an aperture formed in a flange 128, which extends from an end of sleeve 106.

The two sleeves 106 and 116 are held together by retaining collar 112, which is disposed around flange 128 formed on sleeve 106 and is threadably engaged to an outer surface of the front portion 54. As the retaining collar 112 is tightened onto front portion 54, the retaining collar 112 acts on flange 128 to draw sleeve 106 toward front structure 54 and compress resilient member 114 between opposing surfaces 130 and 132 formed on sleeves 106 and 116, respectively. Thus, the action of fastening the sleeves 106 and 116 with the retaining collar 112 serves to preload the resilient member 114. When the coupling structure 52 is assembled, a clearance "c" exists between an end of sleeve 116 and the surface 130 of sleeve 106, and between an end of sleeve 106 and surface 118 front structure 54.

In response to a force F applied to front structure 54, front structure 54, sleeve 116, and retaining collar 112 will move in unison towards tool holder portion 50, reducing the clearances "c" and further compressing resilient member 114 between opposing surfaces 130 and 132. Sleeve 116, which is fixed to front structure 54, slides within sleeve 106, which is fixed to tool holder portion 50, and axial alignment of the tool holder portion 50, coupling structure 52, and front structure 54 is maintained by the interaction between the outer surface of sleeve 116 and the inner surface of sleeve 106. Compression of resilient member 114 absorbs at least a portion of the force F that would have otherwise been applied directly from the pick and place tool 12 to the manipulator 16 (FIG. 1), thereby preventing damage to manipulator 16 and tool 12.

Figure 4:
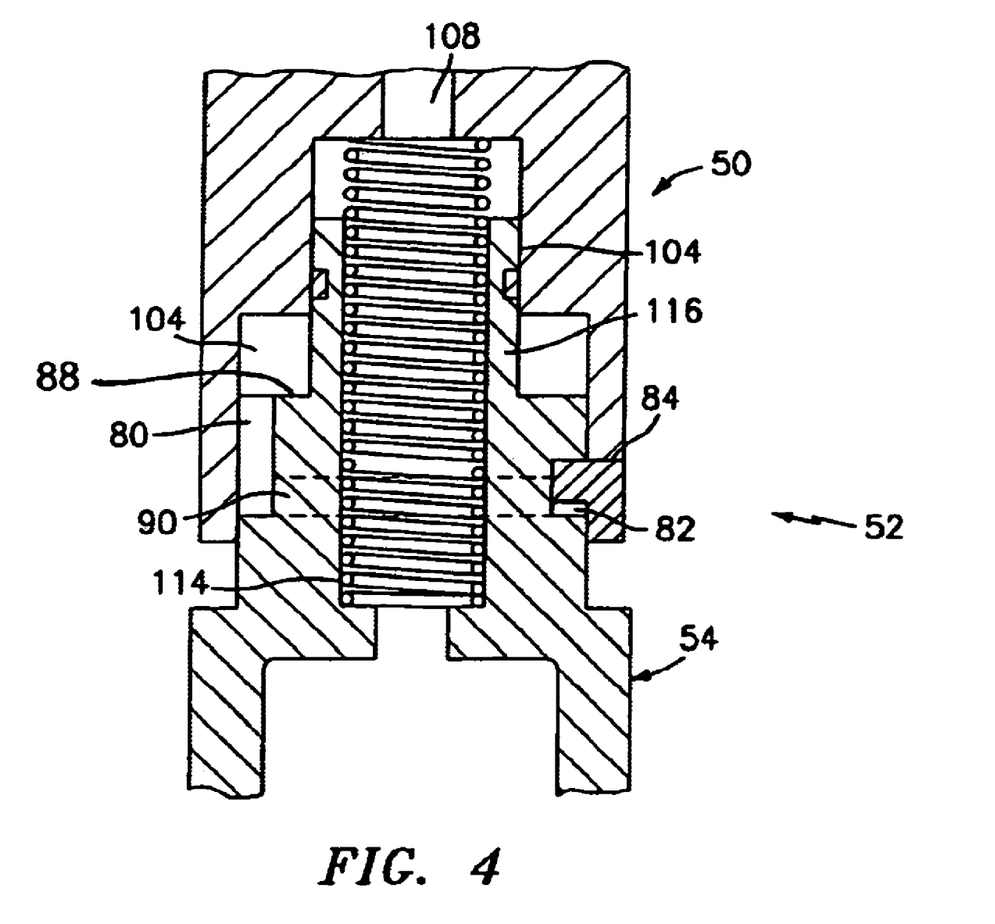
FIG. 4 is a cross-sectional view of a portion of the pick-and-place tool showing an alternative coupling between the pick-and-place tool and a tool holder.
Figure 5:
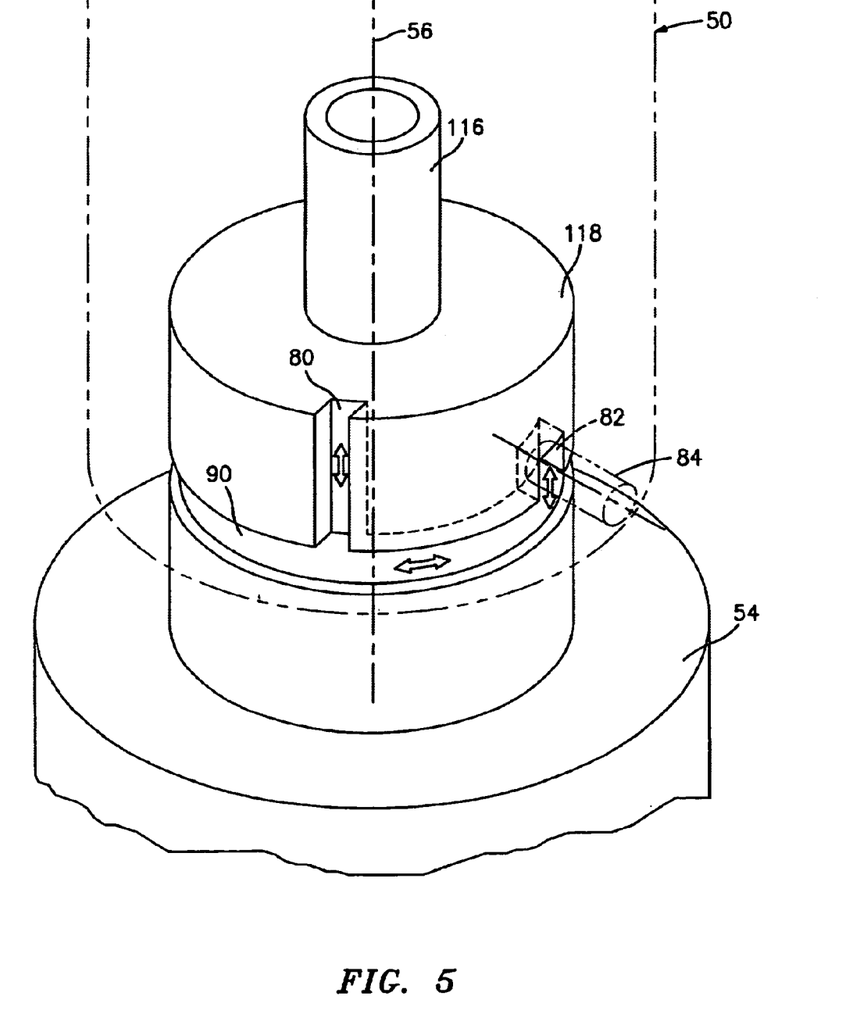
FIG. 5 is a perspective view of the alternative coupling between the pick-and-place tool and the tool holder.

Referring to FIGS. 4 and 5, an alternative embodiment of coupling structure 52 is shown, wherein sleeve 106, retaining collar 112, and pin 126 have been removed. In the embodiment of FIG. 4, sleeve 116 is modified to include a circumferential slot 90, one or more open slots 80 extending parallel to longitudinal axis 56 between circumferential slot 90 and a shoulder 88 formed on sleeve 116, and one or more half-open slots 82 extending from circumferential slot 90 parallel to longitudinal axis 56. Tool holder portion 50 includes one or more bayonet pins 84 extending therefrom within bore 104. Bayonet pins 84 extend within half-open slots 82, and the force of resilient member 114 acts to retain pins 84 within slots 82 to secure front structure 54 to tool holder portion 50. The clearance between bayonet pins 84 and the end of half-open slots 82 proximate circumferential slot 90 provides a clearance for allowing compression of resilient member 114 to absorb at least a portion of the force F on front structure 54. Sleeve 116 can be disconnected from the tool holder portion 50 by forcing front structure 54 toward tool holder portion 50 to compress resilient member 114 and align pins 84 with circumferential slot 90. The front structure 54 is then twisted relative to the tool holder 50 until the bayonet pins 84 are aligned with the open slots 80. Sleeve 116 is then removed from tool holder portion 50 by pulling front structure 54 away from tool holder portion 50. Assembly of the sleeve 116 and tool holder portion 50 is performed by reversing this process.

Referring again to FIG. 3, front portion 54 includes bore 60, which is concentric with longitudinal axis 56 and forms inner surface 62. Locking mechanisms 64 are evenly spaced around inner surface 62. Each locking mechanism 64 includes a bearing 134 disposed in an aperture 136, which extends through the inner surface 62, and a piston 138 disposed within a cylindrical aperture 140, which extends parallel to the longitudinal axis 56. While bearings 134 are shown as balls, other bearing designs may be employed. Apertures 136 are equally spaced around the inner surface 62. Each bearing 134 is trapped within its corresponding aperture 136 by its associated piston 138 and by a pair of wire rings 142, which support the bearings 134 such that a portion of the bearing 134 intrudes into bore 60. Each piston 138 is a cylindrical structure including a locking portion 144 and a recessed portion 146 formed thereon. Recessed portion 146 has a relatively smaller outside diameter than locking portion 144.

Cylindrical apertures 140 are in fluid communication with chamber 120 via fluid passages 148 disposed in front portion 54. Each fluid passage 148 includes a first portion 150, which extends radially outward from a common fluid passage 152, and a second portion 154, which extends between the first portion 150 and the associated cylindrical aperture 140. Fluid pressure in each of the passages 148 acts on one end of the piston 138 to drive the piston 138 towards the free end 58 of front structure 54. A spring 156 acts on an opposite end of the piston 138 to bias the piston 138 in the opposite direction. Spring 156 is contained in front structure 54 by a set screw 158, which allows for preload adjustment of spring 156.

Figure 6:
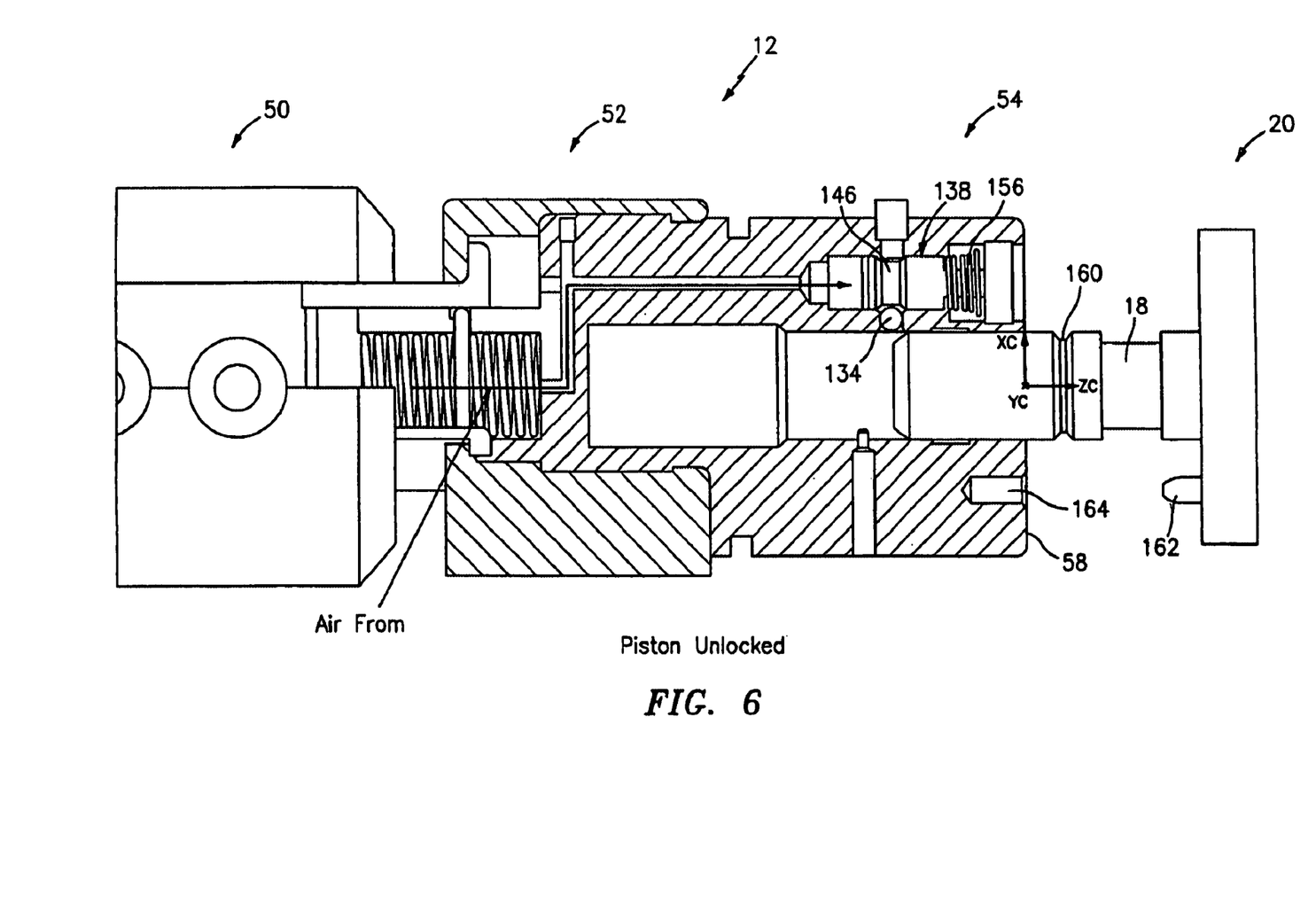
FIG. 6 is a partial cut-away, elevation view of the pick-and-place tool receiving a shaft disposed on a part.

Referring to FIG. 6, a partial cutaway view of pick-and-place tool 12 is shown receiving shaft 18 of part 20. Shaft 18 is shown as a cylindrical structure having a chamfered end. Shaft 18 includes a v-groove 160 disposed around its perimeter and located at a known distance from its base. Part 20 may also include a bullet-nosed dowel pin 162 extending therefrom and positioned at a predetermined distance from shaft. Dowel pin 162 is received by an aperture 164 disposed in free end 58 of front structure 54, and provides a means for ensuring that part 20 does not rotate around shaft 18 when the shaft 18 is secured within the pick-and-place tool 12.

Figure 7:
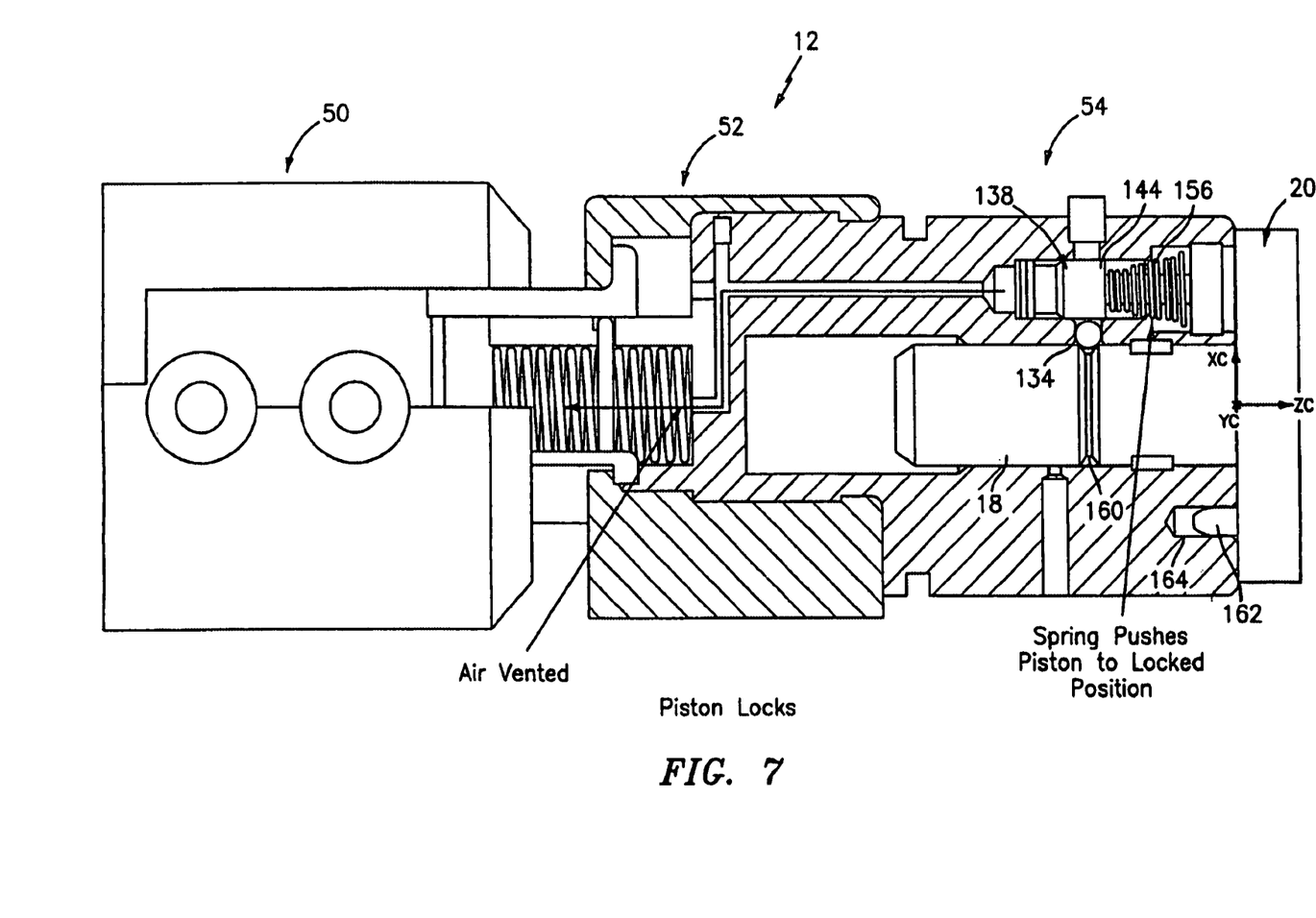
FIG. 7 is a partial cut-away, elevation view of the pick-and-place tool retaining the shaft.

Referring to FIGS. 1, 3, and 5, operation of the pick-and-place tool 12 can be described. The pick-and-place tool 12 may reside in a storage location such as a tool magazine (not shown) during operations where it is not needed. When a pick-and-place operation is required, such as when modular fixture 22 is to be reconfigured, the pick-and-place tool 12 is selected and installed on an end of the manipulator 16. The manipulator 16 then aligns the longitudinal axis 56 of the tool 12 with the shaft 18 and aligns dowel 162 with aperture 164. With the shaft 18 properly aligned, pressurized fluid is applied through the manipulator 16 or other outside source and is routed through the holes 108 and 110, chamber 120, common fluid passage 152, and individual fluid passages 148 to the pistons 138, as shown in FIG. 6. The force of the pressurized fluid overcomes the force of the spring 156, and drives the piston 138 toward the free end 58 of the front structure 54 such that the recessed portion 146 of each piston 138 is positioned proximate the associated bearing 134. With the recessed portion 146 of the piston 138 positioned proximate the bearing 134, the bearing 134 is unlocked and can travel radially outward from longitudinal axis 56 under the force of shaft 18 as manipulator 16 lowers the pick-and-place tool 12 onto the shaft 18. After the manipulator 16 has lowered the tool 12 a predetermined distance onto the shaft 18, the fluid pressure is reduced (e.g., vented to atmosphere), which allows the springs 156 to drive the pistons 138. As the locking portion 144 of the pistons 138 move over the bearings 134, the bearings 134 are forced towards longitudinal axis 56, until they are seated on wire rings 142 and received within v-groove 160 of the shaft 18. The piston 138 comes to rest with the locking portion 144 positioned proximate the bearings 134, as shown in FIG. 7, thus locking the bearings 134 in the v-groove 160. The shaft 18 is now secured within the pick-and-place tool 12 and part 20 can be relocated to a desired location. To release the part 20, fluid pressure is again applied to the pistons 138 to unlock the bearings 134, and the manipulator 16 moves the tool 12 from the shaft 18. It will be appreciated that by simply reversing the positions of the recessed and locking portions 146, 144 of the pistons 138, the operation of the pick-and-place tool 12 with respect to the fluid pressure can be reversed.

Because the bearings 134 act with equal force on the shaft 18, the shaft 18 is aligned with the longitudinal axis 56 of the pick-and-place tool 12 when the shaft 18 is secured within the pick-and-place tool 12. This allows the location of the shaft 18 relative to the manipulator 16 to be determined with a high degree of accuracy. As a result, the pick-and-place tool 12 allows a part 20 to be positioned with a high degree of accuracy. In addition, because the bearings 134 are released simultaneously, this accurate placement is not disturbed when the part 20 is released. Furthermore, because the bearings 134 are mechanically locked into place within v-grooves 160 of shaft 18 by the pistons 138, the pick-and-place tool 12 is able to transmit a large force from the manipulator 16 to the part 20.

In the event that the manipulator 16 is prevented from lowering the pick-and-place tool 12 the predetermined distance onto the shaft 18, for example, due to misalignment of the dowel 162 or contamination of the surface of shaft 18, damage to the manipulator 16 and tool 12 is prevented by the coupling structure 52, which includes a resilient member 114 to absorb at least a portion of the force.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A pick-and-place tool for releasably retaining a part during a pick-and-place operation by an automated device, the part including a shaft, the pick-and-place tool comprising:
   a tool holder portion configured for coupling to the automated device;
   a front structure having a first bore disposed therein for receiving the shaft, the first bore extending from a free end of the front structure and along a longitudinal axis of the front structure, the first bore defining an inner surface of the front structure;
   a first sleeve rigidly coupled to the tool holder portion and extending along the longitudinal axis of the front structure;
   the front structure further having a second sleeve extending from an end of the front structure opposite the free end, the second sleeve being disposed within the first sleeve;
   a coupling feature disposed at the end of the front structure opposite the free end forming thereat a portion of a coupling structure integral to the pick-and-place tool;
   a resilient member disposed between the front structure and the tool holder portion, the resilient member being disposed within the second sleeve and being configured to absorb at least a portion of a force applied to the front structure; and
   a plurality of locking mechanisms disposed within the front structure, the plurality of locking mechanisms being evenly spaced around the inner surface and in fluid communication with a common fluid source, each locking mechanism in the plurality of locking mechanisms including:
      a bearing disposed proximate an aperture in the inner surface, and
      a piston in mechanical communication with the bearing and in fluid communication with the common fluid source, and
      wherein movement of the piston in response to a first fluid pressure at the common fluid source forces the bearing to extend through the aperture and retain the shaft within the first bore.

2. The pick-and-place tool of claim 1, wherein the piston includes a recessed portion formed thereon, and wherein movement of the piston in response to a second fluid pressure at the common fluid source positions the recessed portion proximate the bearing to allow the shalt to be removed from the first bore.

3. The pick-and-place tool of claim 2, wherein each locking mechanism in the plurality of locking mechanisms include:
   a spring configured to bias the piston against the first and second fluid pressures.

4. The pick-and-place tool of claim 1, wherein an internal portion of the first sleeve is in fluid communication between the plurality of locking mechanisms and the common fluid source.

5. The pick-and-place tool of claim 1, wherein the second sleeve being slidably coupled to the tool holder portion.

6. The pick-and-place tool of claim 5, wherein the second sleeve includes:
   a circumferential slot extending around at least a portion of a circumference of the second sleeve,
   an open slot extending between the circumferential slot and a shoulder formed on the second sleeve, and
   a half open slot connected to the circumferential slot; and
wherein the tool holder portion includes:
   a bore disposed therein, the bore receives the second sleeve,
   a pin extending from the tool holder portion within the bore, the half open slot accepting the pin to retain the second sleeve within the bore.

7. The pick-and-place tool of claim 1, wherein the free end of the front structure includes an alignment hole disposed therein for receiving an alignment pin extending from the part.

8. A pick-and-place tool for releasably retaining a part during a pick-and-place operation by an automated device, the part including a shaft, the pick-and-place tool comprising:
   a tool holder portion configured for coupling to the automated device;
   a front structure having a first bore disposed therein for receiving the shaft, the first bore extending from a free end of the front structure and along a longitudinal axis of the front structure, the first bore defining an inner surface of the front structure;
   a first sleeve rigidly coupled to the tool holder portion and extending along the longitudinal axis of the front structure;
   the front structure further having a second sleeve extending from an end of the front structure opposite the free end, the second sleeve being disposed within the first sleeve;
   a coupling feature disposed at the end of the front structure opposite the free end forming thereat a portion of a coupling structure integral to the pick-and-place tool;
   a flange extending from the first sleeve, the coupling feature comprising a collar secured to the front structure and disposed around the flange;
   a resilient member disposed between the front structure and the tool holder portion, the resilient member being disposed within the second sleeve and being configured to absorb at least a portion of a force applied to the front structure; and
   a plurality of locking mechanisms disposed within the front structure, the plurality of locking mechanisms being evenly spaced around the inner surface and in fluid communication with a common fluid source, each locking mechanism in the plurality of locking mechanisms including:
   a bearing disposed proximate an aperture in the inner surface, and
   a piston in mechanical communication with the bearing and in fluid communication with the common fluid source, and
wherein movement of the piston in response to a first fluid pressure at the common fluid source forces the bearing to extend through the aperture and retain the shaft within the first bore.

9. The pick-and-place tool of claim 8, further comprising:
   a pin disposed on the front structure, the pin extends through the flange to prevent the first sleeve from rotating relative to the second sleeve.

10. A pick-and-place tool for releasably retaining a part during a pick-and-place operation by an automated device, the pick-and-place tool comprising:
   a front structure having a first bore disposed therein for receiving at least a portion of the part, the first bore extending from a free end of the front structure and along a longitudinal axis of the front structure;
   a plurality of locking mechanisms disposed at the front structure so as to act with equal force on a shaft of a retained part thereby causing the shaft to be aligned with the longitudinal axis;
   a tool holder portion disposed between the front structure and the automated device;
   a first sleeve rigidly coupled to the tool holder portion and extending along the longitudinal axis of the front structure;
   the front structure further having a second sleeve extending from an end of the front structure opposite the free end, the second sleeve being disposed within the first sleeve;
   a resilient coupling structure coupling the front structure to the tool holder portion; and
   a resilient member disposed between the front structure and the tool holder portion, the resilient member being disposed within the second sleeve and being configured to absorb at least a portion of a force applied to the front structure.

11. The pick-and-place tool of claim 10, wherein an internal portion of the first sleeve forms a chamber for fluid communication between the tool holder portion and the front structure.

12. The pick-and-place tool of claim 10, wherein:
   the coupling structure comprises a collar disposed around a flange extending from the first sleeve, the collar being secured to the front structure.

13. The pick-and-place tool of claim 12, further comprising:
   a pin disposed on the front structure, the pin extends through the flange to prevent the first sleeve from rotating relative to the second sleeve.

14. The pick-and-place tool of claim 10, wherein the second sleeve being slidably coupled to the tool holder portion.

15. The pick-and-place tool of claim 14, wherein the second sleeve includes:
   a circumferential slot extending around at least a portion of a circumference of the second sleeve,
   an open slot extending between the circumferential slot and a shoulder formed on the second sleeve, and a half open slot connected to the circumferential slot; and
wherein the tool holder portion includes:
  a bore disposed therein, the bore receives the second sleeve,
  a pin extending from the tool holder portion within the bore, the half open slot accepting the pin to retain the second sleeve within the bore.

16. The pick-and-place tool of claim 10, wherein the free end of the front structure includes an alignment hole disposed therein for receiving an alignment pin extending from the part.

17. An automated device configured to pick-and-place a part including a shaft, the automated device comprising:
  a manipulator; and
  a pick-and-place tool disposed on an end of the manipulator, the pick-and-place tool including:
  a tool holder portion coupled to the automated device;
  a front structure having a first bore disposed therein for receiving the shaft, the first bore extending from a free end of the front structure and along a longitudinal axis of the front structure, the first bore defining an inner surface of the front structure;
  a first sleeve rigidly coupled to the tool holder portion and extending along the longitudinal axis of the front structure;
  the front structure further having a second sleeve extending from an end of the front structure opposite the free end, the second sleeve being disposed within the first sleeve;
  a resilient member disposed between the front structure and the tool holder portion, the resilient member being disposed within the second sleeve and being configured to absorb at least a portion of a force applied to the front structure;
  a coupling feature disposed at the end of the front structure opposite the free end forming thereat a portion of a coupling structure integral to the pick-and-place tool; and
  a plurality of locking mechanisms disposed within the front structure, the plurality of locking mechanisms being evenly spaced around the inner surface and in fluid communication with a common fluid source, each locking mechanism in the plurality of locking mechanisms including:
    a bearing disposed proximate an aperture in the inner surface, and
    a piston in mechanical communication with the bearing and in fluid communication with the common fluid source, and
    wherein movement of the piston in response to a first fluid pressure at the common fluid source forces the bearing to extend through the aperture and retain the shaft within the first bore.

18. The automated device of claim 17, wherein the piston includes a recessed portion formed thereon, and wherein movement of the piston in response to a second fluid pressure at the common fluid source positions the recessed portion proximate the bearing to allow the shaft to be removed from the first bore.

19. The pick-and-place tool of claim 17, wherein the front structure further includes a sleeve extending from an end of the second sleeve being slidably coupled to the tool holder portion.

20. The pick-and-place tool of claim 19, wherein the second sleeve includes:
  a circumferential slot extending around at least a portion of a circumference of the second sleeve,
  an open slot extending between the circumferential slot and a shoulder formed on the second sleeve, and
  a half open slot connected to the circumferential slot; and
wherein the tool holder includes:
  a bore disposed therein, the bore receives the second sleeve,
  a pin extending from the tool holder within the bore, the half open slot accepting the pin to retain the second sleeve within the bore.

* * * * *